US009811964B2

(12) United States Patent
Doi et al.

(10) Patent No.: US 9,811,964 B2
(45) Date of Patent: Nov. 7, 2017

(54) CURRENCY HANDLING APPARATUS AND CURRENCY HANDLING METHOD

(75) Inventors: Kazuhiro Doi, Hyogo (JP); Tasuku Nakamoto, Hyogo (JP)

(73) Assignee: GLORY LTD., Himeji-shi (JP)

(*) Notice: Subject to any disclaimer, the term of this patent is extended or adjusted under 35 U.S.C. 154(b) by 0 days.

(21) Appl. No.: 13/395,199

(22) PCT Filed: Sep. 11, 2009

(86) PCT No.: PCT/JP2009/065899
§ 371 (c)(1),
(2), (4) Date: Mar. 9, 2012

(87) PCT Pub. No.: WO2011/030437
PCT Pub. Date: Mar. 17, 2011

(65) Prior Publication Data
US 2012/0173352 A1 Jul. 5, 2012

(51) Int. Cl.
*G06Q 10/04* (2012.01)
*G07D 11/00* (2006.01)
(Continued)

(52) U.S. Cl.
CPC ......... *G07D 11/0084* (2013.01); *G06Q 20/20* (2013.01); *G07G 1/12* (2013.01)

(58) Field of Classification Search
USPC .......................................... 705/18, 34; 235/7
See application file for complete search history.

(56) References Cited

U.S. PATENT DOCUMENTS 3,651,986 A * 3/1972 Karecki ............. G07D 11/0003
221/12
5,111,394 A * 5/1992 Hilles .................... G06Q 20/20
109/39
(Continued)

FOREIGN PATENT DOCUMENTS

JP 9-69178 3/1997
JP 10-154254 6/1998
(Continued)

OTHER PUBLICATIONS

European Search Report (Application No. 09849216.8—PCT/JP2009/065899) (5 pages—dated Jun. 26, 2013).

*Primary Examiner* — Talia Crawley
(74) *Attorney, Agent, or Firm* — Foley & Lardner LLP (57) ABSTRACT

Currency handling apparatus comprising: accommodating unit for accommodating various kinds of currencies; a currency discharge opening; a transfer unit for transferring the currencies from the accommodating units to the currency discharge opening; a control unit for controlling the transfer unit to transfer the currencies from the accommodating units to the currency discharge opening thereby to discharge the currencies; and a storage unit for storing various kinds of discharge patterns indicating the numbers of currencies of individual kinds. The control unit is constituted to specify at least one of the discharge patterns in response to the instruction of a user and to discharge the currencies in accordance with the specified discharge pattern. As a result, the user can discharge the desired numbers of currencies of individual kinds merely by performing the simple designating operations.

6 Claims, 8 Drawing Sheets

(51) Int. Cl.
*G06Q 20/20* (2012.01)
*G07G 1/12* (2006.01)

(56) References Cited

U.S. PATENT DOCUMENTS

| | | | | |
|---|---|---|---|---|
| 7,954,699 B1* | 6/2011 | Sanders | | G06Q 20/10 235/375 |
| 7,959,072 B1* | 6/2011 | Jenkins | | G06Q 20/1085 235/375 |
| 8,740,057 B2* | 6/2014 | Stoops | | G07G 1/0027 235/375 |
| 2002/0060400 A1* | 5/2002 | Kobayashi | | B65H 83/02 271/145 |
| 2003/0075595 A1* | 4/2003 | Anderson | | G07G 1/0027 235/22 |
| 2003/0083969 A1* | 5/2003 | Uchiyama | | G06Q 40/00 705/35 |
| 2004/0117061 A1* | 6/2004 | Angove | | G07D 1/02 700/236 |
| 2009/0101723 A1* | 4/2009 | Uehara | | G06Q 20/102 235/7 A |
| 2010/0153250 A1* | 6/2010 | Doki | | G06Q 20/04 705/34 |
| 2011/0153059 A1* | 6/2011 | Matsumoto | | G07D 9/00 700/215 |
| 2011/0225087 A1* | 9/2011 | Agrawal | | G06Q 10/04 705/43 |
| 2013/0054388 A1* | 2/2013 | Ergun | | G06Q 10/087 705/16 |

FOREIGN PATENT DOCUMENTS

| | | |
|---|---|---|
| JP | 2001-067526 | 3/2001 |
| JP | 2002-312821 | 10/2002 |
| JP | 2008-287552 | 11/2008 |

* cited by examiner

CURRENCY HANDLING APPARATUS AND CURRENCY HANDLING METHOD

TECHNICAL FIELD

The present invention relates to a currency handling apparatus and a currency handling method capable of dispensing money of a plurality of denominations.

BACKGROUND ART

Conventionally, cash registers (hereinafter, "register") are widely used in retail stores for payment processing. A register is used by an operator (hereinafter, "cashier") to assist the cashier in the payment processing. Use of the registers allows the cashier to smoothly perform operations like totaling the amount of money from the sale of commodities, accepting cash from and returning change to customers, etc. An administrator (hereinafter, "manager") manages the work done by the cashier and the cash, which includes sales proceeds, etc., inside the register.

Before beginning the payment processing, a drawer inside the register is replenished with change fund that is meant to be used as change. For example, the previous day or before business hours of the current day, a cashier or a manager, who was in charge of the register, does the job of replenishing the change fund. Various currency handling apparatuses that dispense the change fund have been proposed.

For example, in Patent Document 1, a sales proceeds depositing machine is disclosed that accepts only the actual sales proceeds and rejects change fund out of the deposited money. Furthermore, in Patent Document 2, a banknote transaction processing system is disclosed that, when an amount of change fund is input, dispenses money of the specified amount.

CONVENTIONAL ART DOCUMENTS

Patent Documents

[Patent Document 1] Japanese Patent Application Laid-open No. 2001-67526
[Patent Document 2] Japanese Patent Application Laid-open No. 2002-312821

DISCLOSURE OF INVENTION

Problem to be Solved by the Invention

Because money comes in a plurality of denominations, it is preferable that the register be replenished with the change fund in the form of money in each of the denominations in the desired number depending on situations. To achieve this, to produce the change fund, a money dispensing apparatus is used that can dispense money of each denomination in the desired numbers. When dispensing of the change fund from the money dispensing apparatus, it is preferable that it should be easy to specify the desired number of money of each denomination.

For example, if the amount of money or the number of money to be dispensed has to be specified in each denomination for every dispensing, a lot of effort and time will be wasted. For example, a huge workload is put on an operator when performing money dispensing processes a plurality of times in different money dispensing details for a plurality of registers. Furthermore, if the method of specifying the money dispensing details is complicated, errors can occur during input.

The present invention is made in view of the above problems, and it is an object of the present invention to provide a currency handling apparatus and a currency handling method that allows easy specification of money dispensing details when dispensing money in a plurality of denominations in the desired numbers.

Means for Solving the Problem

According to a first aspect of the present invention, a currency handling apparatus includes a plurality of money accommodating units that accommodates therein money; an outlet that dispenses the money accommodated in the money accommodating units; a transport unit that transports the money accommodated in the money accommodating units to the outlet; a storage unit that stores therein a plurality of money dispensing patterns that specify denominations and amounts of dispensing money; an operation unit that can input, change and select the data stored in the storage unit; and a control unit that exerts control over the transport unit to transport the money that are of specified denominations and amounts based on the money dispensing pattern selected by using the operation unit, from the money accommodating units to the outlet for dispensing the transported money.

According to a second aspect of the present invention, in the currency handling apparatus according to the first aspect, the storage unit stores therein the money dispensing patterns and cash register information in a correlated form, and the control unit performs the money dispensing based on the money dispensing pattern corresponding to the cash register information selected by using the operation unit.

According to a third aspect of the present invention, in the currency handling apparatus according to the first aspect, when the number of the money dispensing in the money dispensing pattern is further inputted by using the operation unit, the control unit repeats the money dispensing based on the money dispensing pattern for the number of times inputted for the dispensing processes.

According to a fourth aspect of the present invention, in the currency handling apparatus according to the third aspect, the control unit repeats the money dispensing for the number of times only when the operation for the money dispensing process was approved by password authentication.

According to a fifth aspect of the present invention, in the currency handling apparatus according to the first aspect, when the money of any denomination specified in the money dispensing pattern falls short, the control unit performs the substitute money dispensing of a shortfall amount in a substitute denomination that is different from the denomination that has fallen short.

According to a sixth aspect of the present invention, in the currency handling apparatus according to the fifth aspect, the storage unit stores therein a setting that specifies the substitute denomination that can be used in place of the denomination that falls short; and the control unit performs the substitute money dispensing process based on the setting details stored in the storage unit.

According to a seventh aspect of the present invention, in the currency handling apparatus according to the fifth aspect, the storage unit stores therein a setting that limits the number of money of the substitute denomination that can be used in place of the denomination that falls short, and the control unit performs the substitute money dispensing process based on the setting details stored in the storage unit.

According to an eighth aspect of the present invention, the currency handling apparatus according to the first aspect further includes a sensor that detects a presence or an absence of a money container for accommodating the dispensing money at the outlet. The control unit controls a money dispensing operation based on a detection result of the sensor.

According to a ninth aspect of the present invention, in the currency handling apparatus according to the second aspect, the cash register information includes at least one of a cash register number and a name of a cashier.

According to a tenth aspect of the present invention, in the currency handling apparatus according to the second aspect, the storage unit stores therein money-dispensing permission information that indicates whether to permit the money dispensing on each of the cash register, and the control unit performs the money dispensing sequentially based on the money dispensing pattern corresponding to the cash register on which the money-dispensing permission indicates to permit the money dispensing process.

According to an eleventh aspect of the present invention, in the currency handling apparatus according to the tenth aspect, the control unit performs the money dispensing sequentially based on a plurality of pieces of the cash register information only when the operation for the money dispensing process was approved by password authentication.

According to a twelfth aspect of the present invention, the currency handling apparatus according to the second aspect further includes an information reading unit that reads the cash register information recorded on a medium, and transmits read cash register information to the control unit as selected cash register information.

According to a thirteenth aspect of the present invention, in the currency handling apparatus according to the twelfth aspect, barcode data that includes the cash register information is recorded on the medium.

Advantages of the Invention

According to a first aspect of a currency handling apparatus of the present invention, a user can specify money dispensing details merely by specifying a money dispensing pattern. Therefore, when dispensing of money of each denomination in a predetermined number is to be performed, the user can easily specify the money dispensing details.

According to a second aspect of the present invention, when operating the currency handling apparatus to perform the dispensing of a change fund for a register, merely by specifying a cash register information corresponding to the register, the user can operate the currency handling apparatus to perform money dispensing of the change fund suitable for the specified register.

According to a third aspect of the present invention, the money dispensing in the same money dispensing pattern can be repeated for a specified number of times without having to repeat an operation of specifying the money dispensing pattern.

According to a fourth aspect of the present invention, safety can be ensured by allowing only an authenticated person to perform repeated money dispensing operations.

According to a fifth aspect of the present invention, if there is a shortage of money of a specified denomination, the money dispensing can be performed in money of a substitute denomination.

According to a sixth aspect of the present invention, a condition under which the substitute money dispensing can be performed is restricted by the denomination of the substitute denomination.

According to a seventh aspect of the present invention, a condition under which the substitute money dispensing can be performed is restricted by the number of money to be dispensed in the substitute denomination.

According to an eighth aspect of the present invention, upon detection of the presence of a money container at an outlet, the money dispensing can be automatically started or upon detection of the absence of the money container at the outlet, the money dispensing can be forbidden even if the operation to start the money dispensing is performed.

According to a ninth aspect of the present invention, the register can be specified by a register No. or a name of a cashier.

According to a tenth aspect of the present invention, the money dispensing can be performed sequentially in the money dispensing patterns corresponding to each of the registers for which the money dispensing is permitted based on money-dispensing permission information.

According to an eleventh aspect of the present invention, sequential money dispensing operations for a plurality of registers based on the money-dispensing permission information is enabled only when the operation was approved by password authentication.

According to a twelfth aspect of the present invention, the register can be specified by the cash register information included in an IC card, etc., and money dispensing can be performed for the register specified in this manner.

According to a thirteenth aspect of the present invention, the register can be specified by the cash register information included in a barcode, and money dispensing can be performed for the register specified in this manner.

BEST MODE(S) FOR CARRYING OUT THE INVENTION

Exemplary embodiments of the present invention are explained in detail below with reference to the accompanying drawings. In the present embodiment, a money recycling apparatus is explained as an example of a currency handing apparatus with reference to FIG. 1. The present invention in its broader aspects is not limited to the specific details and representative embodiments shown and described herein. Accordingly, various modifications may be made without departing from the spirit or scope of the general inventive concept as defined by the accompanying claims and their equivalents. For example, the currency handling apparatus according to the present invention need not be limited to the money recycling apparatus; it can be a dedicated money dispensing apparatus, etc., as long as it can dispense change fund.

Figure 1:
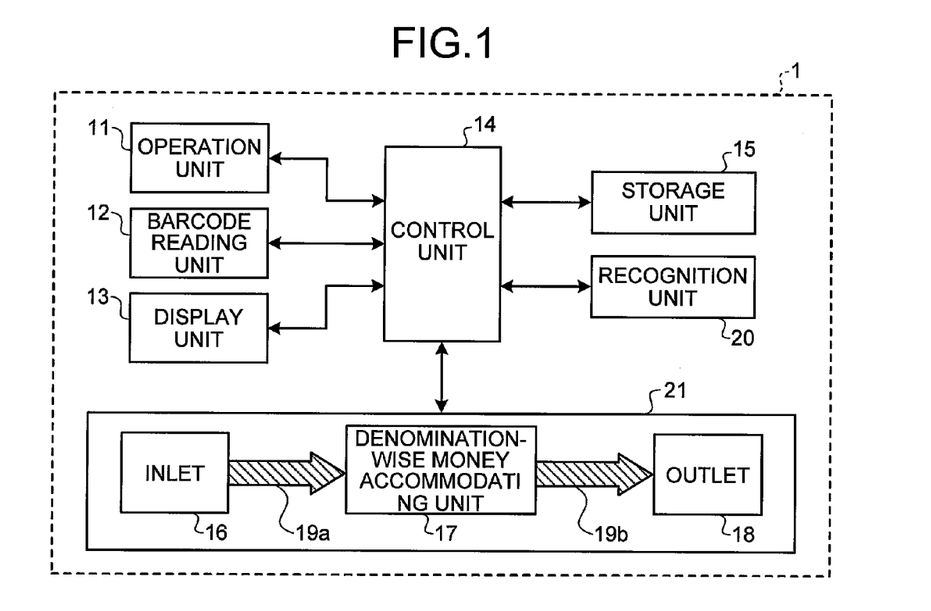
FIG. 1 is a schematic block diagram of a money recycling apparatus according to an embodiment of the present invention.

As shown in FIG. 1, a money recycling apparatus 1 includes an operation unit 11, a barcode reading unit 12, a display unit 13, a storage unit 15, an inlet 16, a recognition unit 20, a money recycling unit 21, and a control unit 14 that controls all the components mentioned above.

The operation unit 11, for example, has a plurality of push-button switches, and is operable by a user. Information relating to the operations performed by using the operation unit 11 is transmitted to the control unit 14, and this enables the money recycling apparatus 1 to execute processes that reflect the intention of the user who operated the operation unit 11.

The operation unit 11 need not be limited to the example described above but can have various other forms. For example, the operation unit 11 can be a keyboard, a touch panel, etc. Furthermore, an OSD (On-Screen Display), etc., displayed on the display unit 13 can also be used as the operation unit 11.

Upon presentation of an object with a barcode printed thereon, the barcode reading unit 12 reads and decodes the barcode and transmits information indicated by the barcode to the control unit 11. This enables the money recycling apparatus 1 to execute a process based on the information recorded as the barcode.

The display unit 13 has a liquid crystal display, etc., and displays various types of information based on commands received from the control unit 14.

The control unit 14 includes, for example, a CPU, etc., and controls each of the components that constitute the money recycling apparatus 1, and implements various types of processes executed by the money recycling apparatus 1. The main processes, such as, the money dispensing process will be explained concretely later.

The storage unit 15 includes a non-volatile memory and stores therein various types of information, such as, computer programs and data.

The recognition unit 20 recognizes the denomination of the money that is deposited and dispensed by the money recycling unit 21. Because a known procedure is adopted for recognition of the denomination of the money, the details are omitted herefrom. Recognition information obtained at the recognition unit 20 is transmitted to the control unit 14.

The money recycling unit 21 includes an inlet 16 for receiving money, an outlet 18 for dispensing money, a denomination-wise money accommodating unit 17 that accommodates therein the money deposited from the inlet 16 based on the denomination and transports the money to be dispensed to the outlet 18, a deposited-money transport unit 19a that transports the money from the inlet 16 to the denomination-wise money accommodating unit 17, and a dispensing-money transport unit 19b that transports the money from the denomination-wise accommodating unit 17 to the outlet 18.

The inlet 16 is for introducing the money that is to be deposited into the money recycling apparatus 1. The deposited money is transported to the denomination-wise money accommodating unit 17 by the deposited-money transport unit 19a. The money handled by the money recycling apparatus 1 can be either banknotes or coins or a combination of both banknotes and coins.

The denomination-wise money accommodating unit 17 includes a plurality of money accommodating units for accommodating the money of predetermined denominations denomination-wise. In the present embodiment, the denomination-wise money accommodating units 17 accommodate therein the money in four denominations, namely, 1 USD, 5 USD, 10 USD, and 20 USD. The denominations can be of other currencies, such as, Yen and Euro.

The outlet 18 is a unit from which dispensing money, dispensed from the money recycling apparatus 1, is discharged. The dispensing money is transported from the denomination-wise money accommodating unit 17 by the dispensing-money transport unit 19b. A money container of a register, which is explained later, can be arranged in the outlet 18. By doing so, the dispensing money that is transported to the outlet 18 is automatically accommodated in the money container. Alternatively, money dispensing can also be carried out without using the money container.

A container detecting sensor is arranged in the outlet 18 for judging whether the money container of the register has been set in the outlet 18. Specifically, for example, an optical sensor, which comprises a light emitting unit and a light receiving unit that are arranged on either side of the money container, can be used as the container detecting sensor. With this structure, if presence of the money container is detected, money dispensing is automatically started, and if presence of the money container is not detected, money dispensing is not performed.

The deposited-money transport unit 19a transports the deposited money based on a command received from the control unit 14. The transported money is accommodated in the denomination-wise money accommodating unit 17 based on the denomination. The recognition information obtained at the recognition unit 20 is used to determine the denominations of the deposited money.

The dispensing-money transport unit 19b transports the dispensing money to the outlet 18 based on information relating to money dispensing details received from the control unit 14. The information received from the control unit 14 includes an amount of money of each denomination to be dispensed.

Various types of mechanisms can be adopted for the deposited-money transport unit 19a and the dispensing-money transport unit 19b; for example, the money can be transported by using a conveyor belt. The mechanisms of the deposited-money transport unit 19a and the dispensing-money transport unit 19b can overlap partially or entirely. For example, the inlet 16 and the outlet 18 can be a common member and a single transport unit can function as the deposited-money transport unit 19a and the dispensing-money transport unit 19b.

The money recycling apparatus 1 can perform a money deposit process, a money dispensing process, and various types of setting processes relating to the money dispensing process by using the structures and operations of the components described above. Furthermore, the money recycling apparatus 1 is used to replenish change funds of a plurality of the registers installed in a store.

Figure 2:
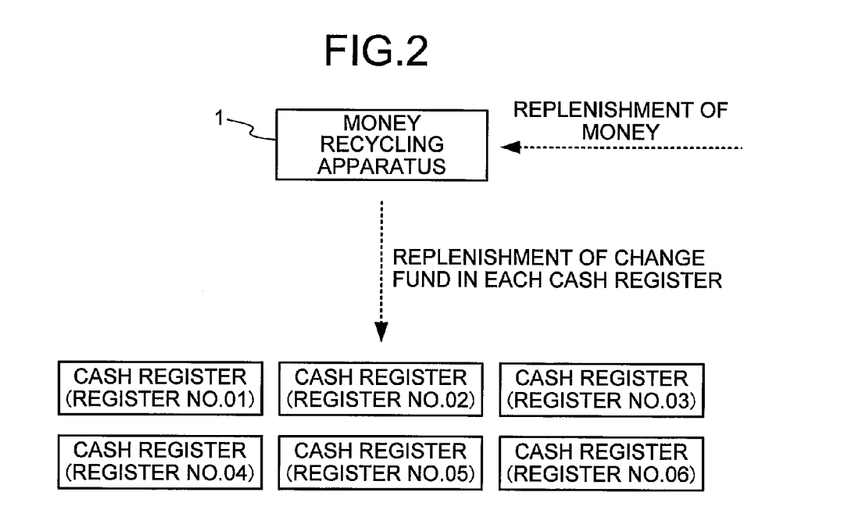
FIG. 2 is a drawing explaining a relation between the money recycling apparatus and registers.

For example, as shown in FIG. 2, the money dispensed from the money recycling apparatus 1 based on a command received from a user is used to replenish the change fund of each register. For the money recycling apparatus 1, the money is replenished by the money deposit process and a money replenishment process. Each of the registers is assigned a unique register number (hereinafter, "register No.") to distinguish each register from other registers.

Each register includes a printing device that prints a barcode. The barcode printed by the printing device includes cash register information, which is information pertaining to the register in which printing device is installed. A cashier uses the barcode reading unit 12 arranged in the money recycling apparatus 1 to read the barcode printed by the assigned register and to input the cash register information into the money recycling apparatus 1.

The cash register information is information that distinguishes each register from other registers, and includes, for example, information such as the register No. The cash register information can includes name or employee number that identifies the cashier who would be operating the register.

Each register includes a money container for accommodating change fund and sales proceeds. For example, a part of a drawer that is removable from a register main body can be used as the money container. With this structure, as mentioned above, the money container can be used by setting it in the outlet 18 of the money recycling apparatus 1.

Figure 3:
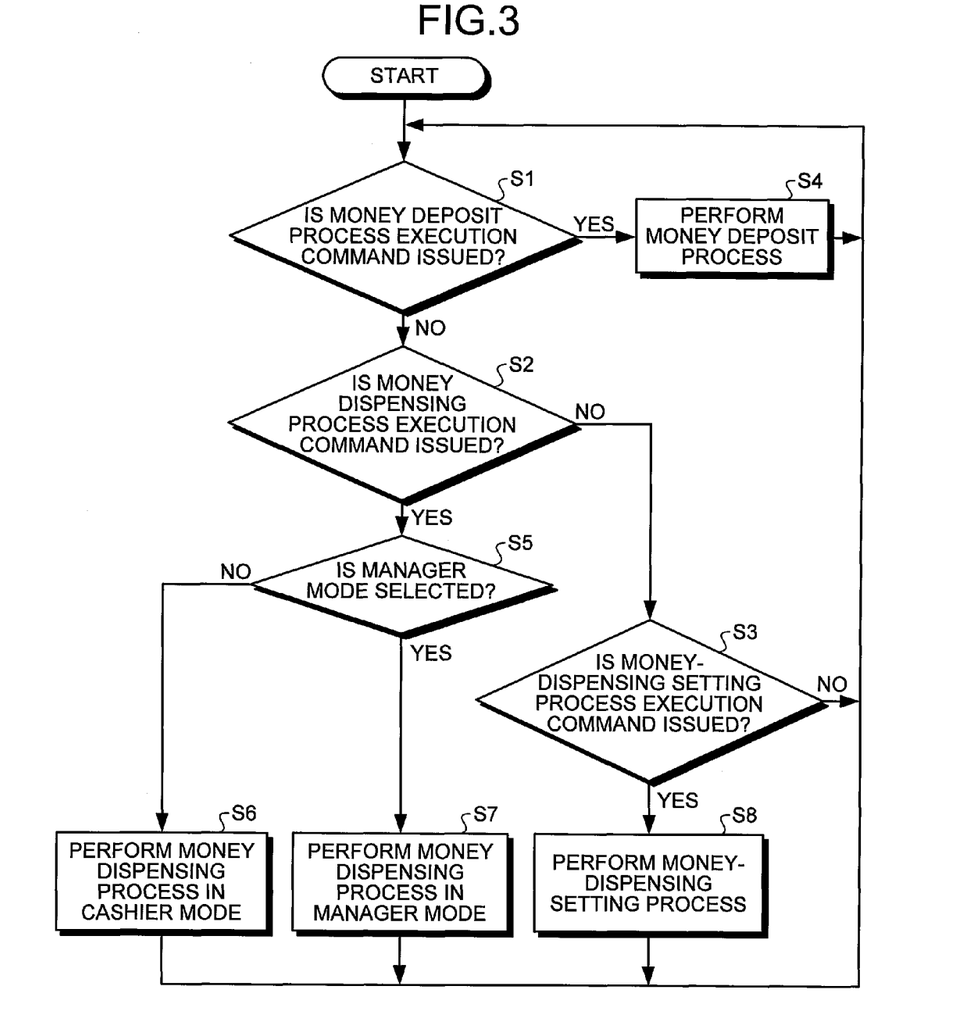
FIG. 3 is a flowchart of main processes performed by the money recycling apparatus.

A process flow of processes executed in the money recycling apparatus 1 is explained with reference to a flowchart shown in FIG. 3.

The money recycling apparatus 1 monitors whether, through an operation of the operation unit 11, an execution command has been issued for executing the money deposit process (Step S1), an execution command has been issued for executing the money dispensing process (Step S2), and an execution command has been issued for executing a money-dispensing setting process (Step S3). If an execution command for executing the money deposit process has been issued (Yes at Step S1), the money recycling apparatus 1 performs the money deposit process (Step S4).

Specifically, the money recycling apparatus 1 allows money to be deposited at the inlet 16 and awaits a command to begin the money deposit process. Alternatively, it is possible to configure so that the money recycling apparatus 1 automatically starts the money deposit process upon detecting deposited money.

Once money deposit is started, the deposited money is transported by the deposited-money transport unit 19*a* to the denomination-wise money accommodating unit 17, where the money is accommodated. Information, such as, deposited amount of each denomination and deposited time, is stored in the storage unit 15. In this way, the number of money and the sum of money, of each denomination, stored in the denomination-wise money accommodating unit 17 can be managed at any time. Upon completion of the money deposit process, the system control is returned to Step S1.

If an execution command for executing the money dispensing process has been issued (Yes at Step S2), the money recycling apparatus 1 determines whether, through the operation of the operation unit 11, a manager mode has been selected (Step S5). If the manager mode is not selected (No at Step S5), the money recycling apparatus 1 performs the money dispensing process in a cashier mode (Step S6). In the cashier mode, the money dispensing is carried out based on commands issued mainly by the cashier responsible for the register. The cashier mode is explained in detail later.

If the manager mode is selected (Yes at Step S5), the money recycling apparatus 1 performs the money dispensing process in the manager mode (Step S7). In the manager mode, the money dispensing is carried out based on commands issued by a manager who is an administrator. The manager mode is explained in detail later. If an execution command for the money-dispensing setting process has been issued (Yes at Step S3), the money recycling apparatus 1 performs the money-dispensing setting process (Step S8).

Figure 4:
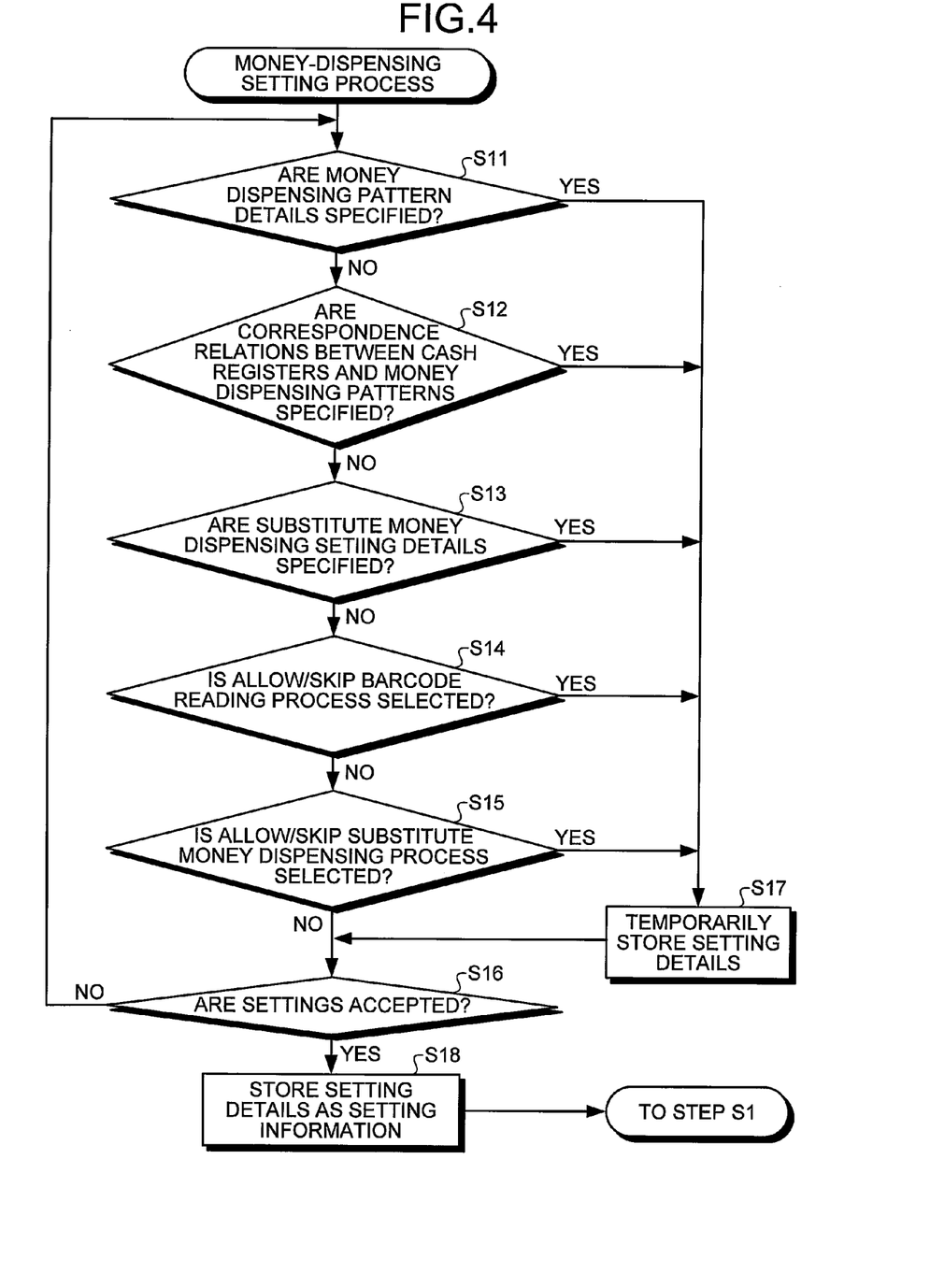
FIG. 4 is a flowchart of a money-dispensing setting process according to an embodiment of the present invention.

A process flow of the money-dispensing setting process is explained concretely with reference to FIG. 4.

Upon commencement of the money-dispensing setting process, the money recycling apparatus 1 monitors whether the user has specified details of a money dispensing pattern (Step S11), a correspondence relation between the register and the money dispensing pattern (Step S12), details of substitute money dispensing (Step S13), a setting to allow/skip reading of the barcode (Step S14), and a setting to allow/skip substitute money dispensing execution (Step S15). Also it is monitored whether settings are accepted by the user (Step S16).

If there is a specification of any of the processes corresponding to Step S11 to Step S15, specification details are temporarily stored in the storage unit 15 (Step S17). If the settings are accepted by the user by selecting OK (Yes at Step S16), the specification details that are temporarily stored at Step S17 are stored as setting information, and are applied to the subsequent processes (Step S18). Upon completion of accommodating of the setting information, the system control is returned to Step S1.

In the money-dispensing setting process, various types of screens are displayed on the display unit 13 (hereinafter, "display") for assisting operations relating to settings, etc. The details of the money-dispensing setting process, including the screens that are displayed on the display, are explained in detail below.

Figure 5:
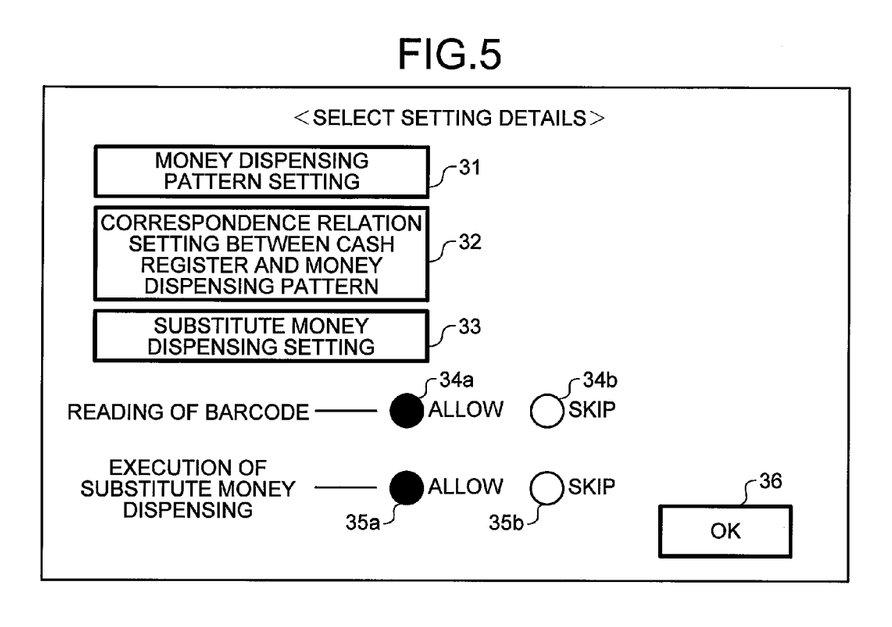
FIG. 5 is a drawing of a screen displayed during the money-dispensing setting process.

Upon commencement of the money-dispensing setting process, a screen shown in FIG. 5 is displayed on the display. This screen is used for selecting setting items. When the user selects items represented by rectangles (31 to 33 and 36) on the screen by using the operation unit 11, corresponding screens are displayed. The selected one of display sections (34*a*, 34*b*, 35*a*, and 35*b*) represented by a circle is displayed in highlight. The setting details can be changed by selecting one of the options for each item by using the operation unit 11.

Figure 6:
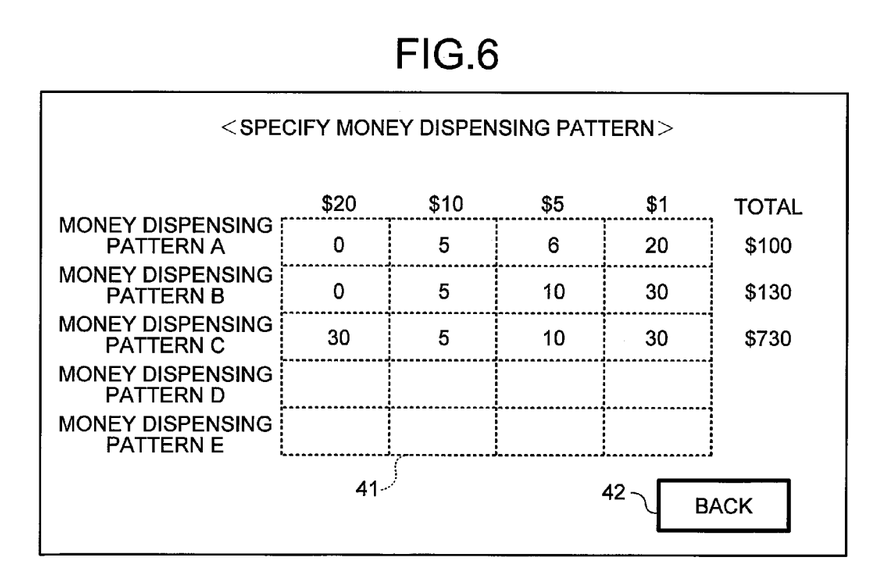
FIG. 6 is a drawing of another screen displayed during the money-dispensing setting process.

In FIG. 5, when "Money dispensing pattern setting" 31 is selected, the screen on the display switches to a screen shown in FIG. 6. This screen is used for setting a money dispensing pattern.

In a table 41 shown in FIG. 6, the rows represent money dispensing patterns and the columns represent the number of banknotes to be dispensed in each denomination. That is, according to FIG. 6, in a money dispensing pattern A, for example, zero banknotes of 20 USD, five banknotes of 10 USD, six banknotes of 5 USD, and 20 banknotes of 1 USD are dispensed.

Any numeric value can be entered in the table 41 by using the operation unit 11. In the table 41, details of the money dispensing pattern are specified by entering the number of banknotes of each denomination to be dispensed (Yes at Step S11). A total amount corresponding to each of the money dispensing pattern is displayed on the right of the table 41. After the setting of the money dispensing pattern is completed, selecting "Back" 42 returns the screen on the display to the screen shown in FIG. 5. The setting details of the money dispensing pattern are stored in the storage unit 15 (Step S17).

The number of money dispensing patterns need not be limited to six. It can be prepared two or more money dispensing patterns. For example, it is possible to prepare six or more money dispensing patterns or six or less money dispensing patterns can also be set. Furthermore, a specification method of the money dispensing pattern need not be limited to specify the number of banknotes, but can be specified a sum of each denomination. The table 41 can display the amount of banknotes as a sum instead of the number of banknotes. The number of banknotes or the sum or both can be displayed by calculating based on the inputted number of banknotes or the sum, and value of each denomination.

In all the setting screens, including the ones that will be explained below, setting operations can be performed by selecting desired items from a displayed list instead of by entering any numeric values and characters.

Figure 7:
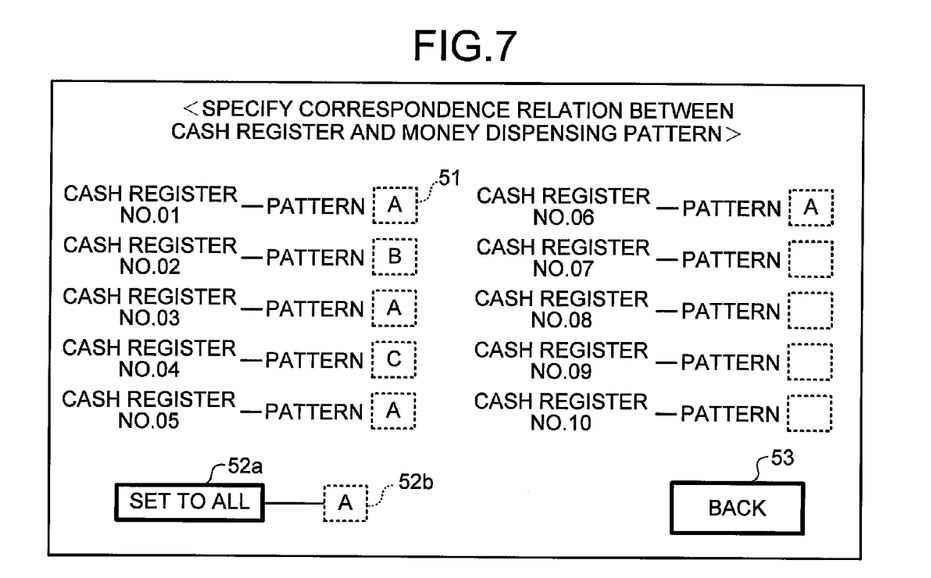
FIG. 7 is a drawing of still another screen displayed during the money-dispensing setting process.

When a "Correspondence relation between register and money dispensing pattern setting" 32 shown in FIG. 5 is selected, the screen on the display switches to a screen shown in FIG. 7. This screen is used for setting a correspondence relation between each register and the money dispensing pattern.

When display sections (52a and 53) represented by rectangles with solid lines on the screen are selected by using the operation unit 11, processing corresponding to the displayed contents are executed. In display sections (51 and 52b) represented by squares with dotted lines, any character, etc., can be entered by using the operation unit 11.

The screen shown in FIG. 7 shows the correspondence relation between each register and the money dispensing pattern. For example, as shown in FIG. 7, the money dispensing pattern A corresponds to the register with a register No. 01, and a money dispensing pattern B corresponds to the register with a register No. 02. The user can use the operation unit 11 to set the desired money dispensing pattern corresponding to each register No.

Instead of entering the money dispensing pattern for each register No., the user can set the same money dispensing pattern to all the registers in one operation. Specifically, the money dispensing pattern displayed in the display section 52b is set to all the registers by executing "Set to all" 52a. With this feature, the workload of the user can be reduced. The money dispensing pattern displayed in the display section 52b can also be set by selecting the money dispensing pattern by using the operation unit 11.

The correspondence relation between the register and the money dispensing pattern can be set only for the registers that are in use. This allows the user to skip setting the money dispensing pattern of the registers that are not in use. For example, in the present embodiment, the number of registers is set as six beforehand; therefore, as shown in FIG. 7, the money dispensing pattern is set only corresponding to the registers with register No. 1 to register No. 6. Setting of the number of registers can be done separately. Alternatively, the setting screen can be set not to show the register Nos. that are not in use.

In this manner, the correspondence relation between the register Nos. and the money dispensing patterns is set (Yes at Step S12). After these settings are completed, selecting "Back" 53 returns the screen on the display to the screen shown in FIG. 5. The setting details of the correspondence relation between the registers and the money dispensing patterns are stored in the storage unit 15 (Step S17).

Figure 8:
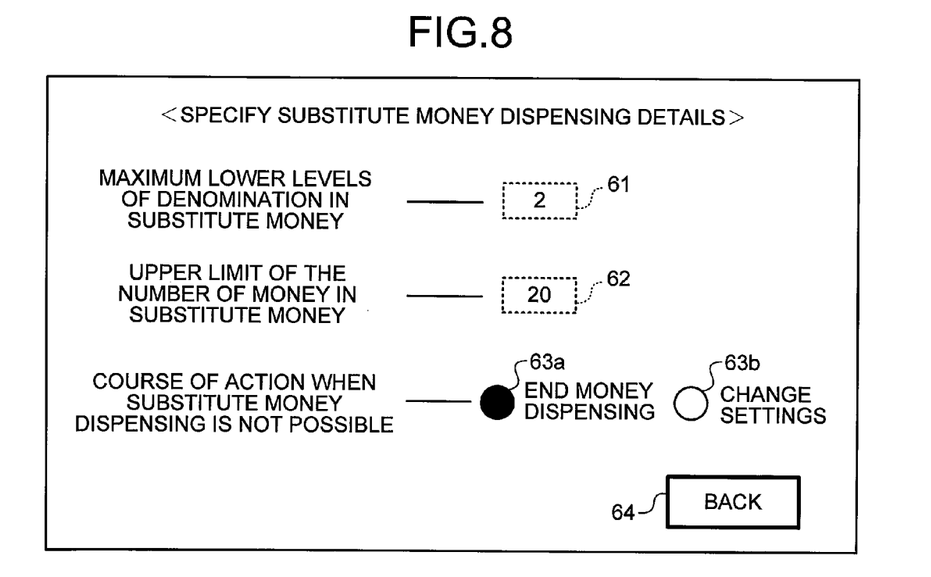
FIG. 8 is a drawing of still another screen displayed during the money-dispensing setting process.

When a display section 33 representing a "Substitute money dispensing setting" shown in FIG. 5 is selected, the screen on the display switches to a screen shown in FIG. 8. This screen is used for setting details of substitute money dispensing.

When a display section 64 represented by a rectangle with a solid line on the screen is selected by using the operation unit 11, processing corresponding to the displayed content is executed. In display sections (61 and 62) represented by squares with dotted lines, any numeric value, etc., can be entered by using the operation unit 11. The selected one of display sections (63a and 63b) represented by circles is displayed in highlight. Any one of the options can be selected by using the operation unit 11.

During money dispensing process, when money to be dispensed falls short, in place of the denomination that has fallen short, the shortfall amount is dispensed in a substitute denomination. This is called substitute money dispensing. Specifically, for example, if one 20 USD banknote to be dispensed falls short, 10 USD banknote is used as the substitute denomination, and two 10 USD banknotes are dispensed in place of the 20 USD banknote that is the shortfall amount.

The display section 61 represents up to how many lower levels of the substitute denomination can be used. Specifically, for example, in FIG. 8, where "2" is set, and substitute money dispensing is being performed for the case where 20 USD banknote falls short, 10 USD banknote which is a first lower level denomination from 20 USD, and 5 USD banknote which is a second lower level denomination from 20 USD can be used for the substitute money dispensing. However, 1 USD banknote cannot be used for the substitute money dispensing.

The display section 62 represents an upper limit of the number of banknotes that can be used in the substitute money dispensing. If "20" is set, as shown in FIG. 8, the substitute money dispensing is not performed in cases where the number of banknotes to be dispensed in the substitute denomination exceeds 20.

Because the denomination and the number of banknotes in the substitute money dispensing can be restricted as explained above, a situation in which the user ends up with unwanted substitute money dispensing can be avoided. For example, if five 50 USD banknotes, which are a part of the amount of money to be dispensed, falls short, by restricting the settings of the substitute money dispensing as explained above, the situation in which 250 banknotes of 1 USD are dispensed in place of the five 50 USD banknotes can be avoided.

By selecting either of the display sections 63a and 63b, the user can specify a course of action to be taken when the substitute money dispensing is not possible during money dispensing. If "End money dispensing" 63a is selected, money dispensing is terminated at the instant where the substitute money dispensing is not possible.

If "Change settings" 63b is selected, when the substitute money dispensing is not possible, money dispensing is temporarily suspended, and the user is allowed to change the details of the substitute money dispensing. If the substitute money dispensing is enabled by changing the settings, the substitute money dispensing that had been suspended is resumed.

In this manner, the details of the substitute money dispensing are set (Yes at Step S13). Selecting "Back" 64 on the screen returns the screen on the display to the screen shown in FIG. 5. The details of the substitute money dispensing are stored in the storage unit 15 (Step S17).

For the item "Reading of barcode" on the screen shown in FIG. 5, if "Allow" 34a is selected, reading of the barcode by the barcode reading unit 12 is enabled (Step S14). On the other hand, if "Skip" 34b is selected, reading of the barcode is not performed. These setting details are stored in the storage unit 15 (Step S17).

For the item "Execution of substitute money dispensing" on the screen shown in FIG. 5, if "Allow" 35a is selected, the substitute money dispensing is enabled based on the setting details explained above with reference to FIG. 8 when there is a shortage of a banknote of a denomination to be dispensed during money dispensing (Step S15). On the other hand, if "Skip" 35b is selected, the substitute money dispensing is not performed. These setting details are stored in the storage unit 15 (Step S17).

If "OK" 36 is selected in FIG. 5, it is judged that the user has accepted the settings (Yes at Step S16). The details set for all the setting items are stored in the storage unit 15 as setting information (Step S18), and the system control is returned to Step S1. Subsequent processes are performed based on the setting information stored in the storage unit 15.

Figure 9:
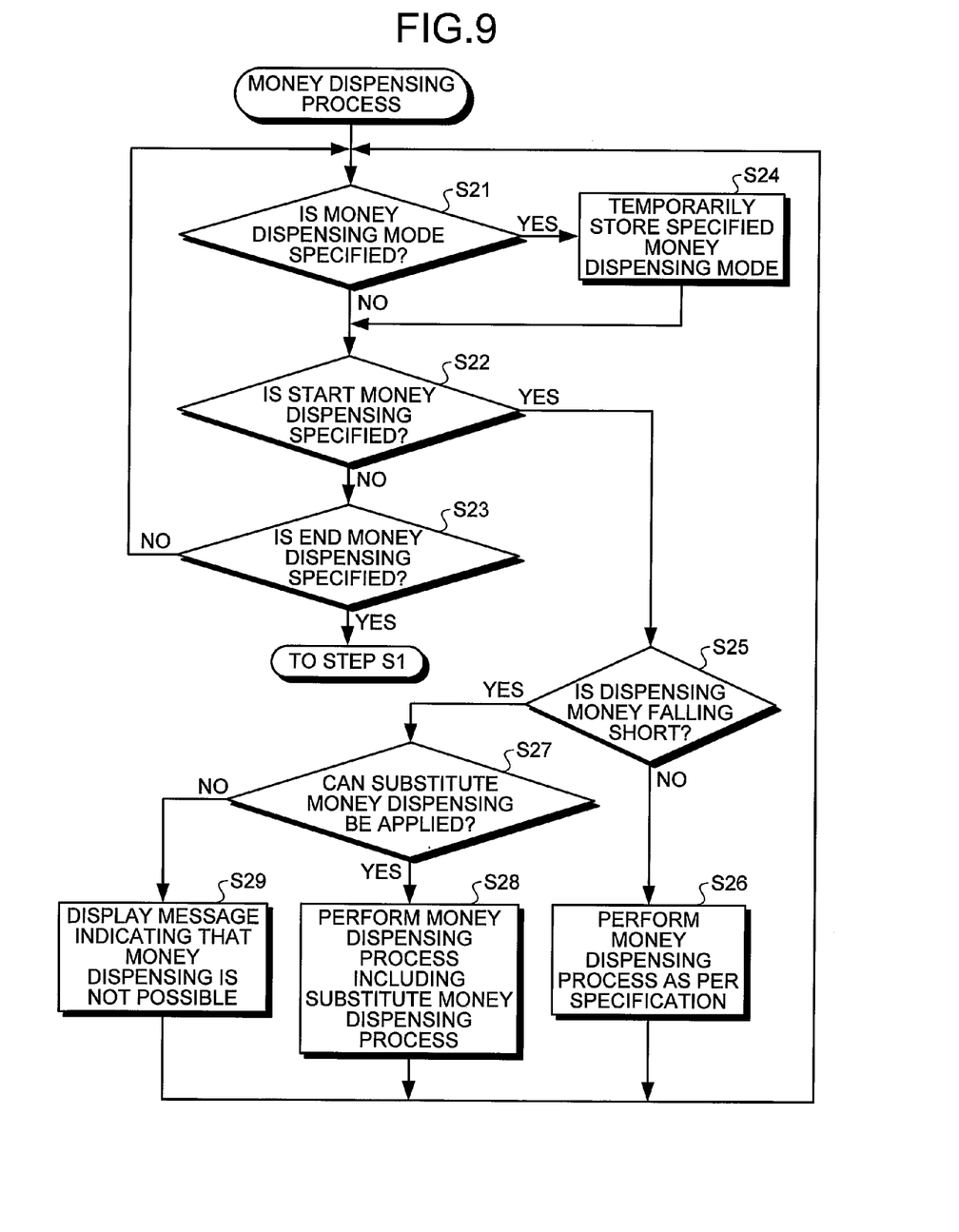
FIG. 9 is a flowchart of a money dispensing process according to an embodiment of the present invention.

A flow of the money dispensing process (Step S6 or Step S7 shown in FIG. 3) is explained next with reference to a flowchart shown in FIG. 9.

Upon commencement of the money dispensing process, the money recycling apparatus 1 monitors whether there has been a money-dispensing mode specification (Step S21), a start money dispensing specification (Step S22), and an end money dispensing specification by the user (Step S23).

When there is a money-dispensing mode specification (Yes at Step S21), specification details are temporarily stored in the storage unit 15 (Step S24). If the money-dispensing mode specification is performed a plurality of times before the start money dispensing specification, the last specification is treated as valid.

When there is a start money dispensing specification (Yes at Step S22) by the user, it is determined whether the money dispensing can be performed if the money dispensing is started in the specified money dispensing mode. That is, it is determined whether there is a shortage of any denomination (Step S25). Specifically, the determination is made by comparing the number of banknotes of each denomination stored in the denomination-wise money accommodating unit 17 and the number of banknotes of each denomination in the specified money dispensing mode.

If, as a result of the comparison, it is determined that money dispensing can be performed (No at Step S25), the money dispensing is performed based on the specified money dispensing mode (Step S26). That is, money dispensing is performed according to the denominations and the number of banknotes set in the money dispensing mode in the table 41 shown in FIG. 6.

On the other hand, if there is a shortage of banknotes of a denomination to be dispensed (Yes at Step S25), it is determined whether the substitute money dispensing can be performed for the amount to be dispensed in banknotes of the denomination which has fallen short if the substitute money dispensing explained above is performed (Step S27). If the substitute money dispensing is allowed according to the setting, and the denomination-wise money accommodating unit 17 contains sufficient number of banknotes of the substitute denomination to enable the substitute money dispensing, the substitute money dispensing is determined to be applicable.

Alternatively the user can be allowed to select whether the substitute money dispensing is to be allowed or skipped at Step S25 where it is confirmed that there is a shortage of banknotes of any denomination. Whether to allow or skip the substitute money dispensing is set beforehand in the money dispensing process. However, by enabling the selection on the substitute money dispensing again at the step where confirmation is made as to whether there is a shortage of any denomination, the effort of returning to the settings of the substitute money dispensing to change the settings and restarting the money dispensing operation can be avoided.

If it is determined that the substitute money dispensing can be performed (Yes at Step S27), the amount of banknotes of the denomination which has fallen short is dispensed in the substitute denomination (Step S28). On the other hand, if it is determined that the substitute money dispensing cannot be performed (No at Step S27), a message indicating that the money dispensing in the specified money dispensing mode is not possible is displayed on the display (Step S29). At this point, the user can be allowed to select whether banknotes of the substitute denomination which are only a part of the amount of the shortfalls should be dispensed.

After the processes at Steps S26, S28, and S29 are performed, the system control is returned to Step S21. When there is a specification for ending the money dispensing by the user (Yes at Step S23), the system control is returned to Step S1.

In the money dispensing process also, various types of screens are displayed on the display to enable operations relating to settings, etc. The money dispensing process including the display contents thereof is explained separately for the cashier mode (Step S6) and the manager mode (Step S7).

A money dispensing process in the cashier mode is explained in detail below.

Figure 10:
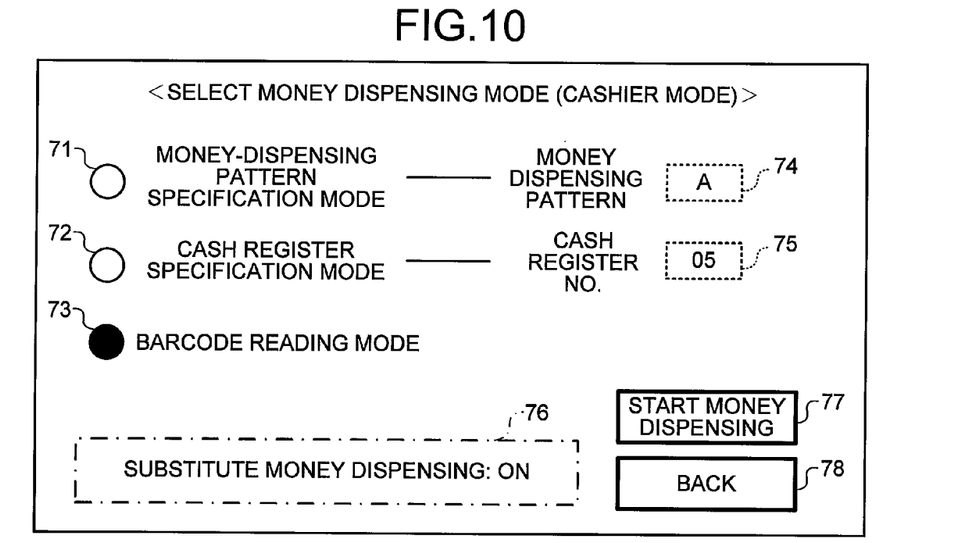
FIG. 10 is a drawing of a screen displayed during the money dispensing process.

Upon commencement of the money dispensing process in the cashier mode, a screen shown in FIG. 10 is displayed on the display. This screen is used by the user for selecting the money dispensing mode.

The selected one of display sections (71 to 73) represented by circles is displayed in highlight. Any of these display sections can be selected by using the operation unit 11. In display sections (74 and 75) represented by rectangles with dotted lines, characters, etc., can be entered by using the operation unit 11. When display sections (77 and 78) represented by rectangles with solid lines are selected, processing corresponding to the display contents are executed.

When the display section 71 is selected, the money dispensing is performed in a money-dispensing pattern specification mode (Step S21). That is, the money dispensing is performed in the money dispensing pattern displayed in the display section 74. For example, as shown in FIG. 10, money dispensing is performed in the "Dispensing pattern A".

If the display section 72 is selected, the money dispensing is performed in "Register specification mode" (Step S21). That is, the money dispensing is performed in the money dispensing pattern corresponding to register with the register No. displayed on the display section 75. For example, as shown in FIG. 10, the money dispensing is performed in the money dispensing pattern corresponding to the register with a register No. 05. The correspondence relation between the registers and the money dispensing patterns is set beforehand by the money-dispensing setting process (Step S12, etc.) explained above with reference to FIG. 7.

When the display section 73 is selected, the money dispensing is performed in "Barcode reading mode" (Step S21). That is, the money dispensing is performed in the money dispensing pattern corresponding to the register with a register No. read by the barcode reading unit 12.

Specifically, upon presentation of the barcode to the barcode reading unit 12, the barcode reading unit 12 reads the barcode. The register No. is specified based on the barcode, and the money dispensing is performed in the money dispensing pattern corresponding to the register with the register No. that is specified by the barcode. However, if reading of the barcode is set to "Skip" in the money-dispensing setting process explained above with reference to FIG. 5, selection of the barcode reading mode is disabled on the screen.

The money dispensing mode specified in this manner is temporarily stored in the storage unit 15 (Step S24). Because the selected one of the display sections (71 to 73) is displayed in highlight, which money dispensing mode is selected can be easily confirmed.

When "Start money dispensing" 77 is executed in a state where any of the money dispensing modes is specified, the money dispensing is started in the specified money dispensing mode (Yes at Step S22). Thereafter, processes corresponding to Steps S25 to S29 are accordingly performed. The money dispensing process is realized by sequential transport of the money accommodated in the denomination-wise money accommodating unit 17 by the dispensing-money transport unit 19b, and discharge of the money from the outlet 18.

The screen shown in FIG. 10 is displayed on the display as before even after performing the processes corresponding to Step S26, Step S28, or Step S29, and the process corresponding to Step S21 can be performed again. In this case, the money dispensing mode that was specified in the previous process remains selected. If the money dispensing is to be performed again in the same money dispensing mode as the previous process, it can be done merely by executing "Start money dispensing" 77 again without having to go through the operation of specifying the money dispensing mode.

Selecting "Back" 78 (corresponding to Yes at Step S23) returns the system control to Step S1 without performing money dispensing. In an information display field 76 on the screen shown in FIG. 10, information indicating whether substitute money dispensing is on, a message indicating that money dispensing by the process corresponding to Step S29 is disabled, etc., is displayed.

In this manner, in the money-dispensing pattern specification mode in the cashier mode, the user can specify the money dispensing details by specifying the money dispensing pattern. Therefore, if predetermined money dispensing patterns are set beforehand in the money recycling apparatus 1, during money dispensing process, the user can omit the operation of specifying the number of banknotes or the amount of each denomination. Consequently, the user can perform the operation of replenishing the change fund quickly. Furthermore, errors in specification operation can be avoided as much as possible.

Because selection can be made from among a plurality of the money dispensing patterns, the user can select suitable money dispensing details depending on the situation.

For example, the details of the change fund to be replenished in the register can vary according to the type of sales counter, whether it is a holiday or a special bargain day, etc. Therefore, by setting the money dispensing pattern suitable for each of such situations beforehand, the user can perform suitable money dispensing by merely selecting the already set pattern.

When setting the money dispensing patterns shown in FIG. 6, the name of the money dispensing pattern can be changed. For example, the patterns can be named "for food section", "for furniture section", "for holidays", "for weekdays", "for special bargain day", etc. This allows the user to easily select the desired dispensing pattern without having to keep in mind which money dispensing pattern has which money dispensing details.

Furthermore, in the register specification mode of the cashier mode, the user can specify the money dispensing details by specifying the register. Consequently, by establishing a correlation between a suitable money dispensing pattern and each of the registers beforehand, the user can perform suitable money dispensing merely by specifying the register in which the change fund is to be replenished.

Particularly, when a fixed cashier is assigned to each register, when replenishing the change fund of the assigned register, the cashier can perform suitable money dispensing merely by specifying the register assigned to the cashier by the cash register information. Consequently, the cashier can easily perform the operation of replenishing the change fund. Specifically, for example, in the money recycling apparatus 1, the money dispensing details can be specified by simply entering the name of the cashier.

Furthermore, in the barcode reading mode, the user can specify the money dispensing details by presenting the barcode. Therefore, by preparing suitable barcodes beforehand, the user can easily specify the money dispensing details. Because the money dispensing details are determined by the barcode, mistakes in input operation can be avoided.

The money recycling apparatus 1 can have a function of printing the barcode. For example, if a barcode indicating the cash register information can be printed on a printing paper, the barcode reading mode can be made easier to use.

In the present embodiment, the money recycling apparatus 1 includes the barcode reading unit 12. However, the present invention is not limited to this configuration. As another embodiment of the present invention, the money recycling apparatus 1 can include an information reading unit that reads the cash register information. For example, instead of or in addition to the barcode reading unit 12, a device that reads information from an IC card or a magnetic card can be used. The user can specify the money dispensing details, for example, by causing the money recycling apparatus 1 to read the IC card or the magnetic card on which the cash register information is recorded. Alternatively, the money recycling apparatus 1 can use fingerprint or face authentication.

Next, a money dispensing process in the manager mode is explained in detail below.

Figure 11:
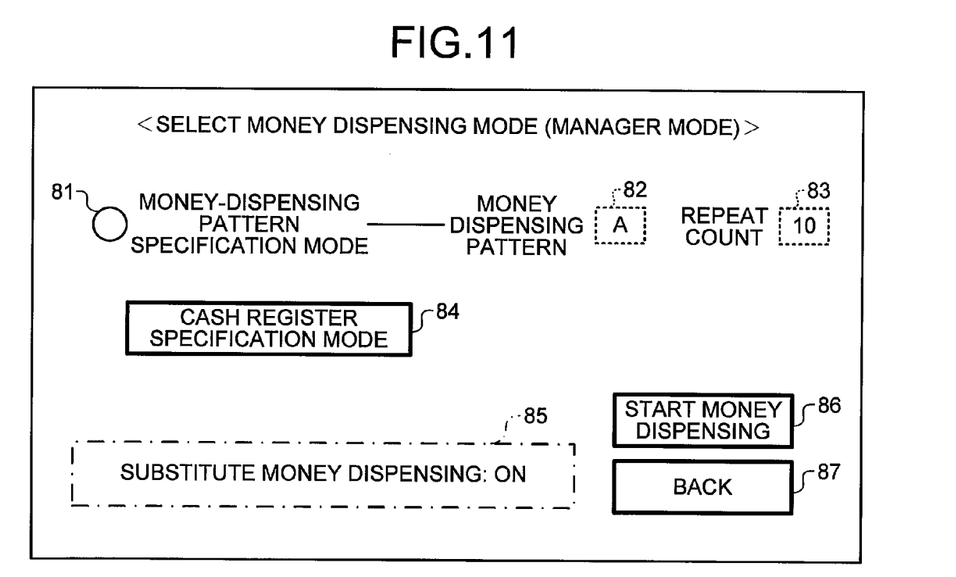
FIG. 11 is a drawing of another screen displayed during the money dispensing process.

Upon commencement of the money dispensing process in the manager mode, a screen shown in FIG. 11 is displayed on the display. This screen is used for selecting the money dispensing mode, etc. A display section 81 represented by a circle can be selected by using the operation unit 11. When already selected, the display section 81 is displayed in highlight. In display sections (82 and 83) represented by rectangles with dotted lines, characters, etc., can be entered by using the operation unit 11. When display sections (86 and 87) represented by rectangles with solid lines are selected, display contents are executed.

When the display section 81 is selected, the money dispensing is performed in "money-dispensing pattern specification mode" (Step S21). That is, money dispensing is repeated the number of times displayed in the display section 83 based on the money dispensing pattern displayed in the display section 82. For example, as shown in FIG. 11, the money dispensing pattern A is repeated ten times.

Figure 12:
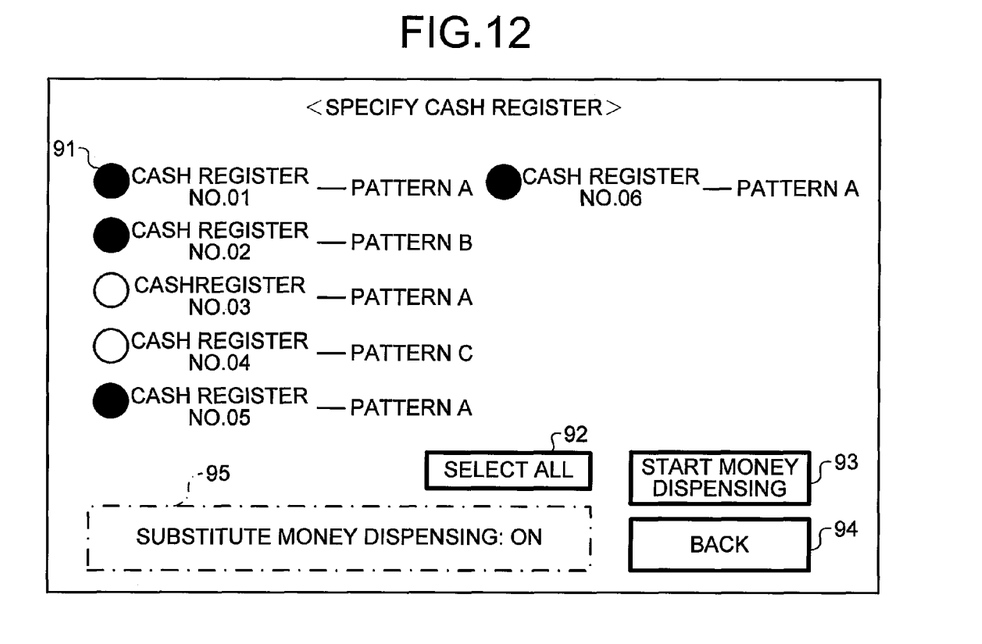
FIG. 12 is a drawing of still another screen displayed during the money dispensing process.

If "Register specification mode" 84 is selected, a screen shown in FIG. 12 is displayed on the display. This screen is used for specifying the register. One or a plurality of display sections 91 represented by circles can be selected by using the operation unit 11. The display section 91 of the selected register No. is displayed in highlight. To the right of each display section 91, the register No. and the money dispensing pattern corresponding to the register with the register No. are displayed. The correspondence relation between the registers and the money dispensing patterns is set beforehand by the money-dispensing setting process (Step S12, etc.) explained above with reference to FIG. 7.

When any of the display sections 91 is selected, the money dispensing is performed in the register specification mode for the selected register No. (Step S21). That is, each of the display sections 91 is money-dispensing permission information that indicates whether money dispensing for the relevant register is to be performed. Money dispensing is performed sequentially for the registers corresponding to the selected display sections 91 that are displayed in highlight based on the corresponding money dispensing patterns.

For example, as shown in FIG. 12, the display sections 91 corresponding to the registers with the register Nos. "01", "02", "05", and "06" are selected. Therefore, money dispensing is performed sequentially in the money dispensing pattern A in the register with the register No. 01, in the money dispensing pattern B in the register with the register No. 02, in the money dispensing pattern A in the register with the register No. 05, and in the money dispensing pattern A in the register with the register No. 06.

Furthermore, when display sections (92 to 94) represented by rectangles with solid lines on the screen are selected by using the operation unit 11, display contents are executed. For example, when "Select all" 92 is executed, all the display sections 91 will be selected. Therefore, when all the registers are to be selected, it can be done merely by executing the display section 92; thus, effort required for selecting of each register can be saved.

An example is explained above in which selection of each of the display sections 91 is executed after entering into the register specification mode. However, alternatively, the setting can be performed in the money-dispensing setting process.

Specifically, in the process corresponding to Step S12 explained above with reference to FIG. 7, the money-dispensing permission information can be set for each register No. similar to the display sections 91. The money-dispensing permission information set for each register is stored as the setting details in the storage unit 12. At the step of the register specification mode, when the setting details that are set beforehand are reflected in the contents of FIG. 12 as initial settings, selection details of the display sections 91 can be changed as required.

Through such settings, if a register to be replenished with the change fund was found, the register can be set beforehand. When the actual money dispensing is performed in the register specification mode, merely "Start money dispensing" 93 shown in FIG. 12 needs to be executed; thus, effort required for selecting of each register can be saved.

Furthermore, after selection of the registers is completed, confirmation of whether money dispensing in a corresponding money dispensing pattern is possible, that is, whether the number of banknotes of each denomination in the denomination-wise money accommodating unit 17 is sufficient for the money dispensing, can be shown on the display.

The money dispensing modes specified as explained above are temporarily stored in the storage unit 15 (Step S24). Upon execution of "Start money dispensing" (77 and 86) with any of the money dispensing modes specified, the money dispensing in the specified money dispensing mode is started (Yes at Step S22).

Thereafter, the processes corresponding to Steps S25 to S29 are suitably performed. The money dispensing process is realized by sequential transport of the money accommodated in the denomination-wise money accommodating unit 17 by the dispensing-money transport unit 19b, and discharge of the money from the outlet 18.

When the money dispensing is being performed, for example, a section of the screen corresponding to the money dispensing shown in FIG. 12 is made to blink. Through such a display, for which register money dispensing is being performed can be checked.

The screen shown in FIG. 11 or FIG. 12 is displayed on the display as before even after performing the processes corresponding to Step S26, Step S28, or Step S29, and the process corresponding to Step S21 can be performed again. In this case, the money dispensing mode that was specified in the previous process remains selected. If the user desires the money dispensing to be executed again in the same money dispensing mode as the previous process, the user can do so merely by executing "Start money dispensing" 77 without having to go through the operation of specifying the money dispensing mode.

Selecting "Back" (87 and 94) (corresponding to Yes at Step S23) returns the system control to Step S1 without performing money dispensing. In an information display field 85 on the screen shown in FIG. 11 or an information display field 95 on the screen shown in FIG. 12, information indicating whether substitute money dispensing is on, a message indicating that money dispensing by the process corresponding to Step S29 is disabled, etc., is displayed.

When the money dispensing is performed in a plurality of the money dispensing patterns with a single start money dispensing specification, the previous process of money dispensing is completed before the next process of money dispensing is started. Detection information of the container detecting sensor arranged in the outlet 18 is used for determining a timing at which the next process of money dispensing is to be started. Specifically, the next process of money dispensing is started at the timing when it is detected that the money container is set again after it is detected that the money container has been removed from the outlet 18 after completion of the previous process of the money dispensing. Through such processes, after performing the money dispensing start specification, as the dispensing of the change fund of one register ends, the user can perform dispensing of the change funds for a plurality of the registers merely by setting a different money container of each of the registers one after another at the outlet 18.

Furthermore, for starting the money dispensing in the money dispensing mode explained above, the user is required to execute "Start money dispensing" (77, 86, and 93). However, the moment the user specifies the money dispensing mode, it can be treated as if the user has made the start money dispensing specification. So the user only needs to specify the money dispensing mode, and set the money container in the outlet 18 thereafter to perform the subsequent money dispensing.

Various other methods apart from the method explained above can be adopted as a method for determining the timing at which a new process of money dispensing is started. For example, the timing can be after a predetermined time period elapses since completion of the previous process of money dispensing or when predetermined operations are performed by the user using the operation unit 11, etc.

In the money-dispensing pattern specification mode of the manager mode, the user can specify the money dispensing details by specifying the money dispensing pattern and a repeat count. Therefore, if predetermined money dispensing patterns are set beforehand, during money dispensing, the user need not to specify the number of banknotes or the amount of each denomination. Consequently, the user can perform the operation of replenishing the change fund quickly. Furthermore, mistakes during specification operation can be avoided as much as possible.

For example, when a single manager has to perform money dispensing operations of the change funds for a plurality of registers having the same change fund details, the manager can specify the number of the registers as the repeat count followed by start money dispensing. Through such settings, the manager can easily perform the desired money dispensing sequentially.

In the register specification mode of the manager mode, the money dispensing details can be specified by specifying a single register or a plurality of the registers. Therefore, by establishing a correlation between a suitable money dispensing pattern and each of the registers beforehand, suitable money dispensing can be performed by the manager merely by specifying the register in which the change fund is to be replenished.

For example, when a single manager has to perform money dispensing operations of the change fund for a plurality of registers, the manager can specify the register followed by start money dispensing. Through such settings, the manager can easily perform the desired money dispensing.

Furthermore, in the manager mode, the money dispensing is performed a plurality of times with a single start money dispensing specification. Consequently, the chance that the amount of dispensing money involved is large is high. Therefore, indiscreet use of these money dispensing modes is not desirable from safety point of view. However, as explained above, these modes can be selected only in the manager mode. Consequently, indiscreet use of these money dispensing modes can be prevented.

To further enhance safety, the user can be made to go through a verification process by entering a password before entering into the manager mode. Furthermore, to prevent any undue changing of the setting details of the money dispensing process, a predetermined verification process can be conducted before the money-dispensing setting process is performed.

Thus, as explained above, the money recycling apparatus 1 includes the denomination-wise money accommodating units 17 that accommodates therein money in a plurality of the denominations, the outlet 18, the money recycling unit 21 that receives and dispenses the money, the control unit 14 that controls each of the components mentioned above and performs the money dispensing, and the storage unit 15 that stores therein a plurality of types of the money dispensing patterns indicating the number of money of each denomination. The control unit 14 specifies at least one money dispensing pattern based on the specification by the user, and performs the money dispensing in the specified money dispensing pattern.

Therefore, with the money recycling apparatus 1, the user can specify the money dispensing details that have been set beforehand merely by specifying the money dispensing mode. Consequently, when performing money dispensing of a predetermined number of banknotes of each denomination, the user can easily specify the money dispensing details.

INDUSTRIAL APPLICABILITY

The present invention is useful in the field of money recycling apparatuses that include a dispensing apparatus or a money dispensing function that performs dispensing of the change fund for usage in the registers.

EXPLANATIONS OF LETTERS OR NUMERALS

1: Money recycling apparatus
11: Operation unit
12: Barcode reading unit
13: Display unit
14: Control unit
15: Storage unit
16: Inlet
17: Denomination-wise money accommodating unit
18: Outlet
19*a*: Deposited-money transport unit
19*b*: Dispensing-money transport unit
20: Recognition unit
21: Money recycling unit

The invention claimed is:

1. A currency handling apparatus for dispensing for change funds used for replenishing a plurality of cash registers, comprising:
   a plurality of money accommodating units that accommodate therein money;
   an outlet that dispenses the money accommodated in the money accommodating units;
   a transport unit that transports the money accommodated in the money accommodating units to the outlet;
   an operation unit by which an operator inputs a single instruction to simultaneously specify the plurality of cash registers to be replenished with the change fund;
   a control unit that controls the transport unit to transport the money from the money accommodating units to the outlet;
   a sensor that detects a presence or an absence of a money container for accommodating therein the money dispensed from the outlet; and
   a storage unit that stores therein previously a plurality of money dispensing patterns, each of which specifies a combination of denominations and amounts of dispensing money, and relations between the plurality of money dispensing patterns and the plurality of cash registers;
   wherein the control unit performs discharging processes based on the money dispensing patterns corresponding to the plurality of cash registers specified by the single instruction, and
   while performing the discharging processes, after completing one discharging process to accommodate the dispensing money into the money container and removing the money container from the outlet, the control unit automatically starts a next discharging process when the sensor detects that the container is set again.

2. The currency handling apparatus according to claim 1, wherein the storage unit stores therein a relation between the operator and the cash register, and
   when the operator inputs information on the operator by using the operation unit, the control unit performs the discharging process based on the money dispensing pattern corresponding to the cash register related to the operator.

3. The currency handling apparatus according to claim 1, further comprising a display unit that displays information indicating that the discharging process being performed is associated with one of the plurality of cash registers.

4. The currency handling apparatus according to claim 3, wherein the display unit displays whether the discharging process can be performed or not, based on information received by the operation unit and information stored in the storage unit.

5. The currency handling apparatus according to claim 4, wherein when the discharging process cannot be performed, the display unit displays whether a substitute discharging process, in which at least a part of the money of the dispensing pattern is discharged in a substitute denomination that is different from a denomination specified for another part of the money, can be performed or not.

6. A currency handling apparatus for dispensing money comprising:
- a plurality of money accommodating units that accommodate therein money;
- an outlet that dispenses the money accommodated in the money accommodating units;
- a transport unit that transports the money accommodated in the money accommodating units to the outlet;
- an operation unit by which an operator simultaneously specifies a denomination and an amount of dispensing money, and a number of times of a discharging process;
- a control unit that controls the transport unit to transport the money from the money accommodating units to the outlet; and
- a sensor that detects a presence or an absence of a money container for accommodating therein the money dispensed from the outlet;
- wherein the control unit performs the discharging process, in which the money of the denomination and the amount specified by the operation unit is dispensed from the outlet, the number of times, and
- while performing the discharging processes, after completing one discharging process to accommodate the dispensing money into the money container and removing the money container from the outlet, the control unit automatically starts a next discharging process when the sensor detects that the container is set again.

* * * * *